United States Patent
Noto et al.

(10) Patent No.: US 8,192,663 B2
(45) Date of Patent: Jun. 5, 2012

(54) METHOD FOR MANUFACTURING A TYRE AND EXTRUDER FOR PRODUCING A SEMI-FINISHED ELASTOMERIC PRODUCT

(75) Inventors: Rodolfo Noto, Gorgonzola (IT); Ignazio De Gese, Sesto San Giovanni (IT); Gaetano Lo Presti, Sesto San Giovanni (IT)

(73) Assignee: Pirelli Pneumaticai S.p.A., Milan (IT)

( * ) Notice: Subject to any disclaimer, the term of this patent is extended or adjusted under 35 U.S.C. 154(b) by 1208 days.

(21) Appl. No.: 10/503,308

(22) PCT Filed: Feb. 5, 2002

(86) PCT No.: PCT/IT02/00064
§ 371 (c)(1), (2), (4) Date: Mar. 3, 2005

(87) PCT Pub. No.: WO03/066313
PCT Pub. Date: Aug. 14, 2003

(65) Prior Publication Data
US 2005/0127568 A1    Jun. 16, 2005

(51) Int. Cl.
*B29C 47/38* (2006.01)
*B29D 30/08* (2006.01)

(52) U.S. Cl. ......... 264/177.17; 156/244.11; 264/211.21; 264/326

(58) Field of Classification Search .............. 264/177.1, 264/209.2, 326, 177.17, 211.21; 156/244.11, 156/188–190; 425/131.1, 381
See application file for complete search history.

(56) References Cited

U.S. PATENT DOCUMENTS

| | | | |
|---|---|---|---|
| 2,061,407 A | | 11/1936 | Royle |
| 2,860,775 A | | 11/1958 | Brauchler |
| 4,652,224 A | * | 3/1987 | Golisch ...................... 425/131.1 |
| 4,963,207 A | | 10/1990 | Laurent |
| 5,221,406 A | * | 6/1993 | Laurent .......................... 156/397 |

(Continued)

FOREIGN PATENT DOCUMENTS

EP    0 928 680 B1    7/1999

(Continued)

OTHER PUBLICATIONS

Michaeli, W., "Extrusion Dies", Carl Hanser Verlag, Munich, Germany, pp. 323-332, (1984).

(Continued)

*Primary Examiner* — Matheiu D. Vargot
(74) *Attorney, Agent, or Firm* — Finnegan, Henderson, Farabow, Garrett & Dunner, L.L.P.

(57) ABSTRACT

A method for manufacturing a tire includes making at least one semi-finished elementary product of elastomeric material and depositing it in adjacent turns on a toroidal support. Making the at least one elementary product includes extruding the elastomeric material through an extruder head including a bushing defining a tapered extrusion channel. An extruder includes a chamber, at least one helical screw disposed in the chamber, and the extruder head. The head includes an outer tubular body attached by one end to the chamber, a bushing disposed inside the body to define the tapered extrusion channel, and a die disposed inside the body. A ratio of an area of the inlet section to an area of the outlet section is greater than 5:1 and less than 100:1 and a ratio of a diameter of the inlet section to a length of the bushing is greater than 0.1 and less than 1:1.

5 Claims, 5 Drawing Sheets

U.S. PATENT DOCUMENTS

| | | | |
|---|---|---|---|
| 5,221,541 A | 6/1993 | Arbour et al. | |
| 5,609,687 A | 3/1997 | Neff | |

FOREIGN PATENT DOCUMENTS

| | | |
|---|---|---|
| GB | 1 526 777 | 9/1978 |
| JP | 63-89336 | 4/1988 |
| JP | 3-253323 | 11/1991 |
| JP | 4-107008 | 9/1992 |

OTHER PUBLICATIONS

English-language Abstract for JP 3-253323.

English-language machine translation for JP 4-107008.

* cited by examiner

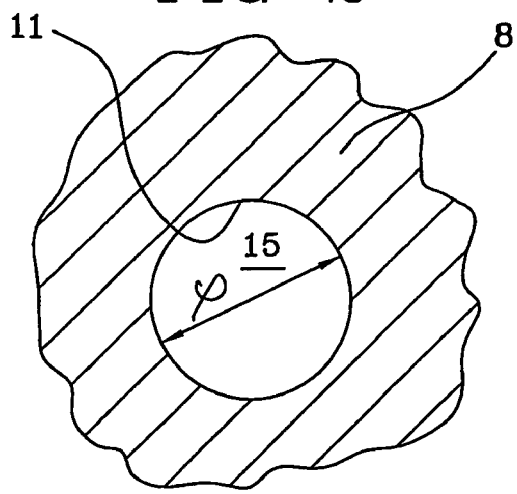
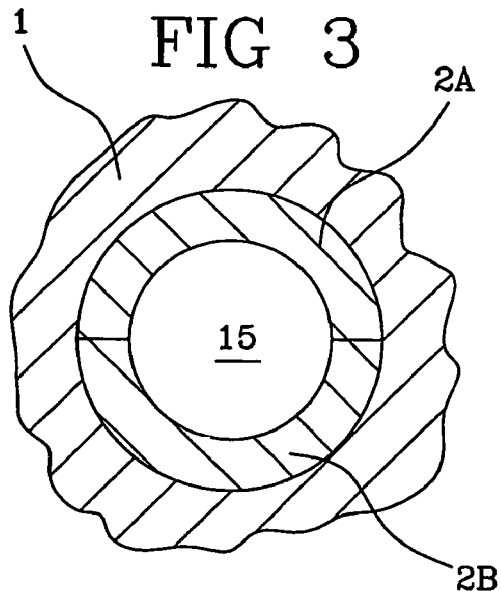
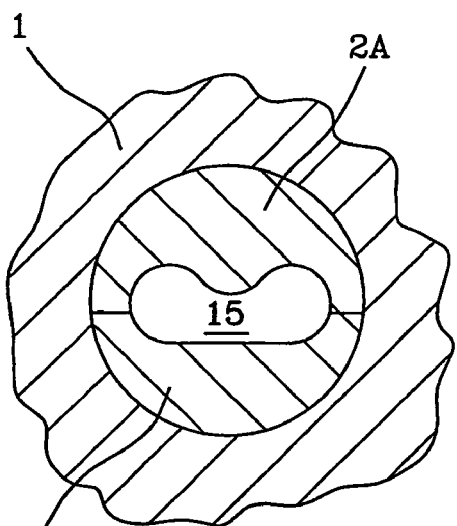
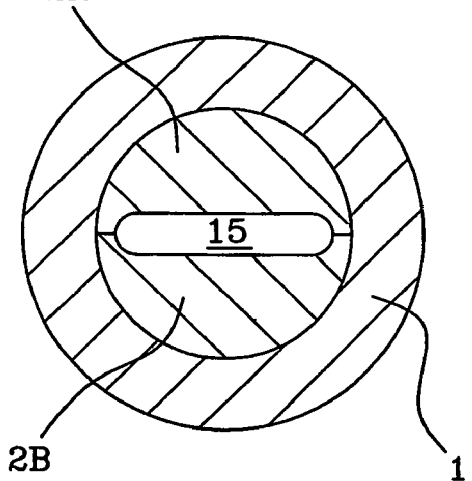
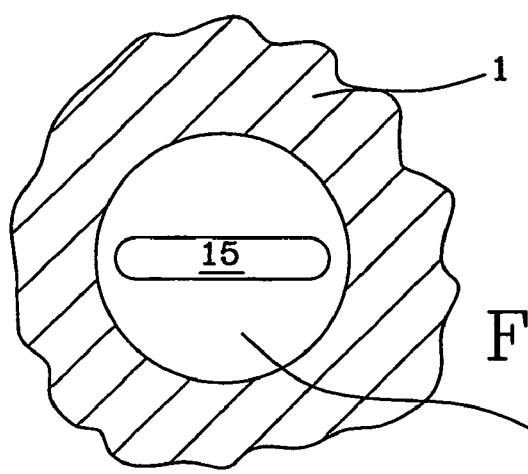

METHOD FOR MANUFACTURING A TYRE AND EXTRUDER FOR PRODUCING A SEMI-FINISHED ELASTOMERIC PRODUCT

CROSS-REFERENCE TO RELATED APPLICATIONS

This application is a national-phase entry under 35 U.S.C. §371 from International Application No. PCT/IT02/00064, filed Feb. 5, 2002, in the Italian Patent Office, the content of which is relied upon and incorporated herein by reference.

BACKGROUND OF THE INVENTION

1. Field of the Invention

The present invention relates to a tyre manufacturing method and to an apparatus, in particular an extruder, for producing a ribbon in elastomeric material for making at least one component of said tyre.

2. Description of the Related Art

In the present description and in the claims which follow the term "ribbon" means a strip of elastomeric material, the thickness of which is constant or variable in a transverse direction to the strip itself, for use in a rubber article. Preferably said rubber article is a tyre.

It should be pointed out that, for the purposes of the present description, the term "elastomeric material" means a composition comprising at least one elastomeric polymer and at least one reinforcing filler. Said composition preferably also includes additives such as crosslinking agents and/or plasticizers.

A tyre usually comprises: a torically shaped carcass comprising at least one reinforcing ply whose ends are securely attached to a pair of radially inward bead cores, a tread band located around said carcass, and a belt structure between said at least one reinforcing ply and said tread band.

Said belt structure usually comprises at least two strips of rubberized fabric overlaid radially one on top of the other and containing embedded metal reinforcing cords which are laid parallel and side by side within each strip and crossed with those of the adjacent strip, preferably symmetrically with respect to the equatorial plane of the tyre. Preferably, said belt structure also includes a further reinforcing strip radially external to said at least two radially superimposed strips, said further strip containing embedded reinforcing cords laid substantially parallel to the equatorial plane of the tyre.

In tyre manufacturing processes the elastomeric components are, for example, the tread band, the side walls, the airtight rubber layer (liner) covering the internal surface of the tyres designed for use without an inner tube (tubeless tyres), the rubber sheet laid between the tread band and the belt structure or the rubber sheet which sometimes is inserted between two separate belt strips, the sheets of limited width and transversely variable thickness laid underneath the edges of the belt structure, or the sheets of limited width and constant thickness folded around the edges of the belt strips.

Generally, the manufacture of the above-mentioned components requires the initial preparation of an elastomeric compound according to a suitable recipe whose ingredients are chosen to suit the particular component to be obtained.

Successively the preparation of said elastomeric compound, one known process for producing said components involves using an extruder whose function is to work the elastomeric material, as it advances along the extruder body, from a supply section to an extrusion section, forcing the material through a final suitable orifice whose dimensions and geometry are determined according to the profile of the cross section of the component to be obtained.

Usually, extruders are apparatuses that comprise a closed cylindrical body defining in its interior a chamber containing a helical screw for advancing the elastomeric material. Said chamber communicates at one end with the exterior through a hopper (through which the elastomeric compound is introduced) situated in the vicinity of said supply section; while at a second end of said chamber is connected an extrusion head (or extruder head) which communicates with the exterior through the abovementioned orifice positioned in said extrusion section. The walls of the extrusion head usually taper gradually to promote the conveying of the elastomeric material towards said orifice.

The final portion of said helical screw terminates at the beginning of said extrusion head. Said screw has a finned profile running helically along the longitudinal direction of the screw, according to one or more predetermined pitches suitably selected to produce the desired working conditions for the extruder and the rheometric characteristics of the elastomeric compound to be worked.

During its advancing path along the inside of the extruder, due to the rotary movement of the screw, the elastomeric material is subjected to a plasticizing action by the abovementioned finned profile and terminates its path by accumulating in the space between the end portion of the screw and the tapering walls of the extruder head from where the elastomeric material is pushed at high pressure towards the orifice mentioned above.

In the conventional tyre manufacturing technique, each elastomeric component is extruded in its final shape and then sent, e.g. by means of a conveyor belt on which it may optionally be cooled, to winding spools or to storage surfaces (e.g. the so called "book trolley") ready to be used on the manufacturing machines.

An example of a known extruder for producing tyre components is described in U.S. Pat. No. 5,221,541. Said extruder comprises, downstream of the extrusion screw, a series of metal plates assembled together which together define a longitudinal passage whose cross section is continuously variable and leads into an extrusion orifice. The profile of the cross section of said passage along its longitudinal path varies from a circular section having the greatest area to a substantially oval section having the smallest area. The main characteristic of said longitudinal passage consists in that between the two end sections is present at least one intermediate section whose cross-sectional area is greater than that of the section immediate upstream, the function of said intermediate section being to reduce the temperature of the elastomeric compound prior to its extrusion.

In more recent tyre manufacturing processes, as for example shown in European patent application EP-928,680 in the name of the Applicant, a tyre is formed directly on a toroidal support by overlaying axially adjacent and/or radially superimposed turns of a semi-finished elementary product of appropriate dimensions wound onto said support immediately after it has been made. In particular, three different types of semi-finished elementary products are used, specifically: a profiled strip of elastomeric material only, i.e. the "ribbon" referred to earlier; a strip of elastomeric material containing embedded elongate reinforcing elements, typically textile or metal cords, henceforth defined as "ribbon-like band"; and rubberized metal wires or cords.

The demands made by the most recent tyre manufacturing processes require ribbons of very small cross-sectional dimensions.

The extruders known in the art are capable of producing ribbons of such dimensions provided that their extruder heads are very long in the longitudinal direction. This technological solution, with a gradual change in the cross section of the extrusion channel, avoids the problems of flow instability of the elastomeric material that occur in longitudinally shorter extruders due to sudden change in the cross section of the extrusion channel. Thanks to the longitudinal length of said extruder heads, said technological solution allows easier machining of the inside walls of said channel and prevents the development of shear stresses in the elastomeric material that would generate heat sufficient to cause undesirable scorching of said material.

SUMMARY OF THE INVENTION

However, very long extruder heads are not conveniently usable in the abovementioned tyre manufacturing processes since the space requirements are too high. In fact, said processes require the extruder heads from which said ribbons are dispensed to be close to the toroidal support on which the tyre is made because the ribbons are used immediately after being produced with no intermediate storage step.

The Applicant has perceived that the recent tyre manufacturing processes require extruder heads of short longitudinal dimensions capable of producing ribbons of reduced cross sections dimensions.

In particular, the Applicant has perceived that, in order to fulfil said requirement, it is advantageous to avoid the development of phenomena of flow instability in the elastomeric material passing through the extruder head.

The Applicant has found that in a tyre manufacturing process that uses the abovementioned semi-finished elementary products, in order to be able to produce a ribbon with reduced transverse dimensions and directly applicable onto a toroidal support on which said tyre is built, an extruder of limited longitudinal dimensions with a suitably tapered extrusion channel is required.

In general, the invention relates to a tyre manufacturing method comprising the steps of: making at least one semi-finished elementary product in elastomeric material; depositing said semi-finished elementary product by overlaying it in adjacent turns on a toroidal support, in which said at least one semi-finished elementary product is produced by extruding said elastomeric material through an extruder head provided with a bush defining a tapered extrusion channel. Preferably, said bush has an inlet section and an outlet section in which the ratio between the cross-sectional area of said inlet section and the cross-sectional area of said outlet section is between 5 and 100 and the ratio between the diameter of said inlet section and the length of said bush is between 0.1 and 1.

Even preferably, the invention relates to a tyre manufacturing method comprising the steps of: making at least one semi-finished elementary product in elastomeric material; depositing said semi-finished elementary product by overlaying it in adjacent turns on a toroidal support, in which the step of making said at least one semi-finished elementary product is carried out by extruding said elastomeric material through an extruder head provided with a bush defining a tapered extrusion channel, said bush comprising at least two parts that can be assembled on a diametrical plane and being bounded by an external surface having a profile complementary to the internal profile of a tubular body associated to said bush.

Preferably, the inside walls (forming the extrusion channel) of the connectable parts of said bush, being easily accessible, are suitably shaped to provide the desired tapering degree.

Furthermore, said inside walls of the connectable parts of said bush, being easily accessible, preferably undergo one or more surface treatments to eliminate, or at least reduce, the phenomena of flow instability mentioned above.

Even preferably, said semi-finished elementary product is a ribbon.

Even preferably, the cross section of the extrusion channel evolves continuously and regularly from a substantially circular section of the inlet section of the bush to a flattened section of the outlet section of said bush.

In a particular aspect, the extrusion channel is formed by axial abutment of cylindrical portions of different diameters, said cylindrical portions being connected together, stepwise, by means of coaxial annular surfaces perpendicular to the axis of the extrusion channel.

In a further aspect, the invention relates to an extruder for producing a semi-finished elastomeric product of predetermined shape and dimensions, comprising a chamber, in which is located at least one helical screw provided to advance an elastomeric compound along said chamber, the chamber being provided at one end with an extruder head and at the other end communicating with the exterior through a port through which the elastomeric compound is introduced, said extruder head comprising: an outer tubular body attached by one end to said chamber, a bush positioned inside said tubular body to define a tapered extrusion channel, and a die mounted inside said tubular body and in axial abutment against said bush, the extruder being characterized in that said bush has an inlet section and an outlet section in which the ratio between the area of said inlet section and the area of said outlet section is between 5 and 100 and the ratio between the diameter of said inlet section and the length of said bush is between 0.1 and 1.

Preferably, said bush comprises at least two parts that assemble on a diametrical plane and together define the extrusion channel, and an external surface with a profile complementary to the internal profile of the tubular body.

Preferably, the cross section of the extrusion channel evolves continuously and regularly from a substantially circular section to a flattened (preferably rectangular, with rounded corners) section passing from the end nearest the chamber to the end abutted against the die.

Preferably, the external surface of the bush comprises cylindrical portions of progressively decreasing diameter.

Preferably, the external surface of the bush comprises cylindrical portions of different diameters connected together stepwise by coaxial annular surfaces perpendicular to the axis of the bush.

In particular, the die is provided with an axial hole formed by a tapered portion that connects with the extrusion channel and by a constant-section portion.

Even in particular, the external surface of the die comprises two cylindrical portions of different diameters connected together by a coaxial annular surface perpendicular to the axis of the die.

Preferably, a seal is inserted in the tubular body between the end of said chamber and the end of said bush, the internal surface of the seal joining an outlet section of the chamber to an inlet section of said bush.

BRIEF DESCRIPTION OF THE DRAWINGS

Further features and advantages will become clearer in the light of the description of two preferred embodiments of the present invention.

Said description, given below, refers to the attached drawings, which are provided purely by way of explanation and without any limitation being intended. In the drawings:

FIG. 2 shows a schematic cross section of the extruder head taken on plane II-II of FIG. 1 at the outlet end of the chamber;

FIG. 3 shows a schematic cross section of the extruder head taken on a plane III-III of FIG. 1;

FIG. 4 shows a schematic cross section of the extruder head taken on plane IV-IV of FIG. 1;

FIG. 5 shows a schematic cross section of the extruder head taken on plane V-V of FIG. 1, on the plane where the bush and the die are in abutment;

FIG. 6 shows a front view of the extruder head;

DETAILED DESCRIPTION OF THE EXEMPLARY EMBODIMENTS

A tyre usually comprises a carcass structure having at least one carcass ply of toroidal shape, associated by its circumferential edges to a pair of annular reinforcing structures or "bead cores", each reinforcing structure being positioned in the finished tyre in an area usually known as the "bead" which ensures the fitting of the tyre into the respective fitting rim. In a position radially external to the abovementioned carcass ply is provided a belt structure comprising one or more belt strips laid on top of each other. A tread band is laid radially external to the abovementioned belt structure: in the vulcanized tyre said band has a suitable tread pattern moulded into it during the vulcanizing process; lastly, two side walls are laterally placed on opposite sides of the abovementioned carcass structure. The carcass structure is preferably covered radially on the inside by a layer of elastomeric material known as the "liner" to ensure that the tyre is airtight under running conditions.

An example of a tyre manufacturing process is described in the abovementioned European Patent Application EP-928, 680. Briefly, a limited number of semi-finished elementary products, as defined earlier, are fed onto a toroidal support 30 (shown in FIG. 10) having the shape of the internal walls of the tyre to be made. Said support is conveyed, preferably by a robotized system 40, between a plurality of stations, at each of which a particular tyre-manufacturing step is carried out in automated sequences. By overlaying said semi-finished elementary products on said toroidal support in adjacent turns, the entire structure of the green tyre as explained above is formed.

Figure 10:
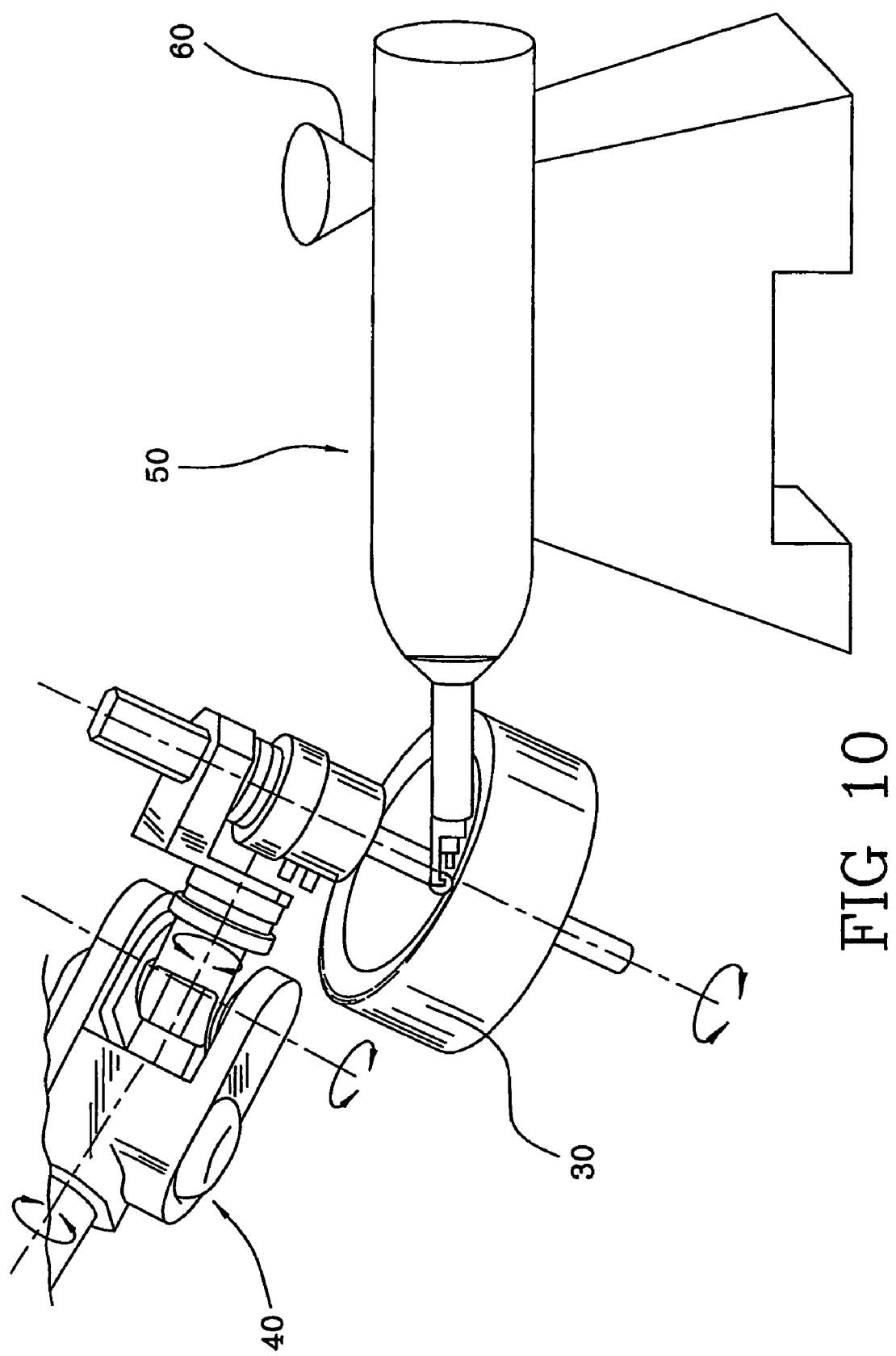
FIG. 10 shows a perspective view of the extruder according to the invention during the manufacturing process of a tyre.

In particular, FIG. 10 illustrates the step in which a ribbon is deposited on said toroidal support 30 by an extruder 50 to form one of the purely elastomeric components (such as for example the liner, tread band side walls) of the above tyre.

Figure 1:
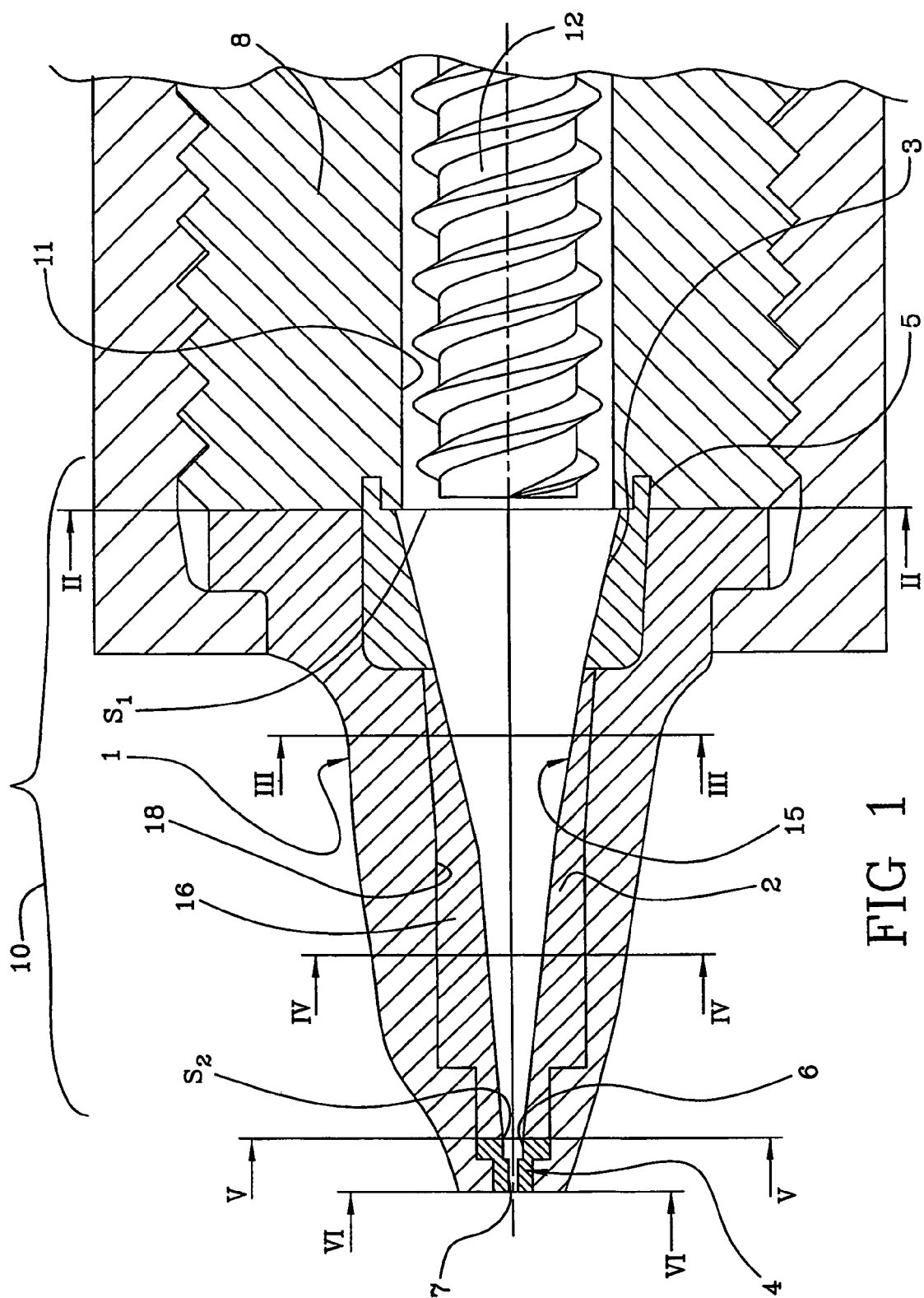
FIG. 1 shows a partial longitudinal section of an extruder according to the invention.

More precisely, FIG. 1 illustrates in section the end portion of said extruder 50 according to the invention for the manufacture of said ribbon, which is of substantially flattened shape. To give an indication, said type of ribbon is preferably between 5 mm and 50 mm wide and between 0.1 mm and 5 mm thick.

Said extruder comprises a cylindrical body 8 that defines a coaxial chamber 11, inside which a helical screw 12 is located to advance an elastomeric compound along said chamber. At a terminal end (the outlet section), the diameter $\Phi$ of the chamber 11 is of about 60 mm. At one end of the cylindrical body is placed an extrusion head bearing the general reference 10, while at the other end the cylindrical body communicates with the outside through a port or hopper 60 through which the elastomeric compound is introduced into the extruder 50.

In a first preferred embodiment of the invention, the extrusion head 10 comprises an outer tubular body 1 of generally conical external profile, attached at its larger-diameter end to the outlet of the chamber 11, i.e. to said terminal end. The outer tubular body 1 comprises a coaxial hole whose surface 18 is formed by a succession stepwise of cross sections of different diameters, decreasing towards the smallest-diameter end of said tubular body 1. Mounted inside the tubular body 1 are a bush 2 and an extrusion die 4.

Preferably, the bush 2 is made up of at least two parts (half-bushes 2A, 2B in FIGS. 3-5, 8) which together define an extrusion channel 15 of tapered type and an outer surface 16 that fits into the internal surface 18 of the tubular body 1. Preferably, said surface 16 follows a stepped profile so as to exhibit ridges as explained later in the following of the present description.

The axial hole in the tubular body 1, suitable for receiving the bush 2 in order to form the extrusion channel 15, can be made without great difficulty by using conventional machine tools, such as milling cutters. In fact, the walls of said hole do not have to interact directly with the extruding elastomeric material and therefore require no special machining and require only a minimum of two distinct cross sections whose diameters decrease from the inlet section to the extrusion section of said tubular body 1.

Preferably, the bush 2 is made of a steel alloy and is positioned inside the tubular body 1, which is made of a metallic material.

Figure 9:
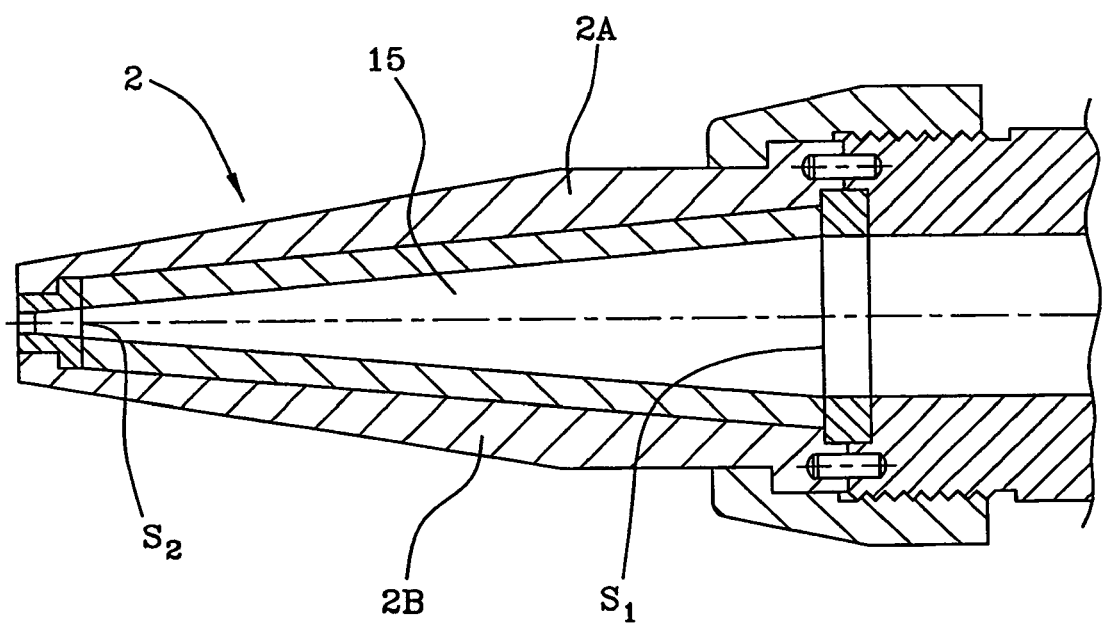
FIG. 9 shows a partial longitudinal section of an extruder head containing a bush according to a further embodiment of the invention.

In a different embodiment shown in FIG. 9, said external surface 16 substantially follows the tapered profile of the extrusion channel 15, giving the walls of said bush a substantially constant thickness.

The extrusion channel 15 extends the full length of said tubular body 1, from the outlet section of the chamber 11 to the outlet section of said die 4.

The taper of the channel 15 is such as to progressively vary the cross section of said channel along the longitudinal direction, reducing the radial dimension and leaving the transverse direction substantially unaltered, thus progressively transforming the right cross section of said channel from circular to elliptical.

The extrusion die 4 is preferably made of a single piece of abrasion-resistant material and is mounted inside the tubular body 1 in axial abutment against the bush 2. Said die 4 is provided with an axial hole formed by a first tapered portion 6 connected with said extrusion channel 15, and by a second portion 7 of constant section from which the extruded elastomeric compound exits.

The external surface of the die 4 comprises two cylindrical portions of different diameters connected together by a coaxial annular surface perpendicular to the axis of the die.

The diameter of the smaller-diameter cylindrical portion of the die 4 is the same as the diameter of the exit hole of the terminal part of the tubular body 1. Preferably, the length of said second portion 7 in the axial direction is equal to the diameter of the hole of the tubular body 1 in the extrusion section. In the section where said bush 2 and said die 4 are in axial abutment, the inside diameter of said tubular body 1 is equal to the outside diameter of said bush 2 and of said die 4. In this way the die is securely clamped in position at the end of the tubular body 1 and the two or more parts that formp the bush 2 are assembled together and fitted to the tubular body 1.

In a preferred embodiment the length of the die 4 is between 1 and 10 mm.

Given the small dimensions of the die 4, the latter can be made without difficulty by using conventional machine tools. The die is made of a very hard material (such as widia) for long-term resistance to abrasion caused by the passage of the elastomeric material. This material is very abrasive, especially if it contains silicious fillers.

From an operating point of view, the bush 2 is required to withstand the axial forces exerted on the die 4 by the flow of elastomeric material pushed by the extruder screw. Note that the pressure exerted by the extruder at the beginning of the extrusion channel 15 is generally between 70 and 1200 bar.

In the particular embodiment of the invention shown in FIG. 1, the Applicant has found that it is helpful not to subject the die 4 to said forces but instead divert them onto the much more robust tubular body 1. To this end, in the abovementioned particular embodiment and as described earlier, the radially external surface of said bush 2 has been shaped in such a way as to possess at least one step, through the surface of which said force is transmitted from the bush to the tubular body 1.

An annular seal 3, e.g. made of steel, axially tapered in the direction of the die 4 may preferably be inserted in the tubular body 1 between said terminal end of the chamber 11 and the bush 2. Said seal conveys the flow of elastomeric compound arriving from the screw 12 towards said die 4. The seal 3, which is preferably cylindrical, is equal in outside diameter and length to the diameter and length of the larger-diameter internal hole of the tubular body 1. The internal surface of the seal 3 is such as to join said terminal section of the chamber 11 to the inlet section of the bush 2. The seal 3 preferably has a centring ring 5 which fits into a circumferential groove formed in the cylindrical body 8. Said centring ring 5 also acts as a seal to prevent elastomeric material escaping between the chamber 11 and the bush 2.

In an alternative embodiment to that shown in FIG. 1, the bush 2 may be axially extended as far as the end section of the chamber 11, and there would be no seal 3.

FIG. 2 is a schematic cross section of the extruder head at the end section of the chamber 11, which is of circular cross section.

FIG. 3 shows a schematic cross section of the extruder head 10 taken on the plane III-III of FIG. 1, downstream of the seal 3. Visible in this figure are the two half-bushes 2A and 2B whose internal profiles on said section define the section of the extrusion channel 15, which in this part of the extruder head is shaped like an ellipse squashed in the vertical direction.

Preferably, the bush comprises connection means for connecting together its various component parts. In a preferred solution (not shown) said connection means consist of longitudinal ribs running along at least one edge of each part, and of corresponding longitudinal grooves running along the corresponding edge of the mating part.

FIG. 4, which shows a schematic cross section of the extruder head 10 taken on the plane IV-IV of FIG. 1, shows how the shape of the two half-bushes 2A, 2B has reduced the extrusion channel 15 to a kidney-like cross section, while keeping the transverse dimension always equal to the diameter Φ of the chamber 11.

The cross section shown in FIG. 5, taken at the plane of abutment between the bush 2 and the die 4, illustrates the now flattened profile of the extrusion channel 15, which is now the same as that of the inlet section of the die 4.

FIG. 6 is a front view of the extruder head showing the extrusion section.

In a preferred embodiment of the invention, which uses a bush 2 and a seal 3 as described above, the Applicant has found it advantageous to give the extruder head 10 the specific geometric characteristics detailed below which can be adopted either separately or in combination with each other:

- a value of the ratio $S_1/S_2$ between the area of the inlet section $S_1$ of the extrusion channel 15 (equivalent to the area of the end section of the chamber 11) and the area of the outlet section $S_2$ of the same channel 15 (equivalent to the area of the inlet section of the die 4) between 5 and 100, preferably between 8 and 12;

- a value of the ratio between the diameter Φ of the end section of the chamber 11 and the length L of the extruder head 10 (i.e. the distance between the end section of the chamber 11 and the outlet section of the die 4) between 0.5 and 0.05;

- a value of the ratio $d_b/l_b$ between the diameter $d_b$ of the inlet section of the bush 2 and the length $l_b$ of the bush between 0.1 and 1;

- a value of the ratio $l_g/l_b$ between the distance $l_g$ of the stepwise section of said bush that is nearest the die 4 but does not coincide with the inlet section of said die, from the inlet section of the bush, and the length $l_b$ of the bush between 0.1 and 0.5;

- a value of the ratio $d_{ge}/d_{gi}$ between the outside diameter $d_{ge}$ and the inside diameter $d_{gi}$ of the annular surface of at least one stepwise section of the bush 2 between 0.3 and 0.85; and

- a value of the ratio $\Phi/l_0$ between the diameter Φ of the end section of the chamber 11 (equivalent to the inlet section of the extruder head 10) and the length $l_0$ of the seal 3 fitted between said end section and the inlet section of the bush 2 between 0.1 and 1.

Figure 7:
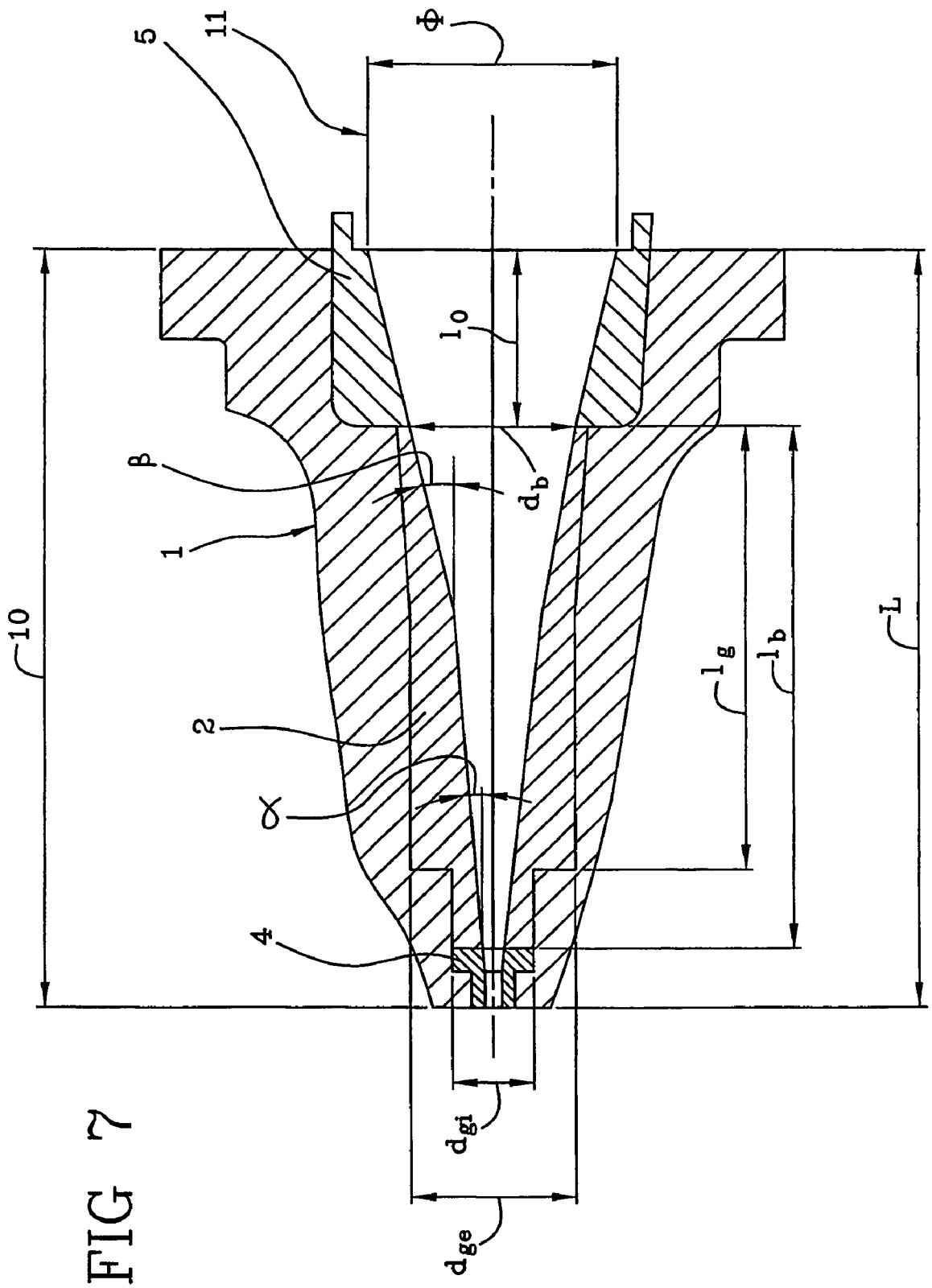
FIG. 7 shows a partial longitudinal section of an extruder head according to the invention.
Figure 8:
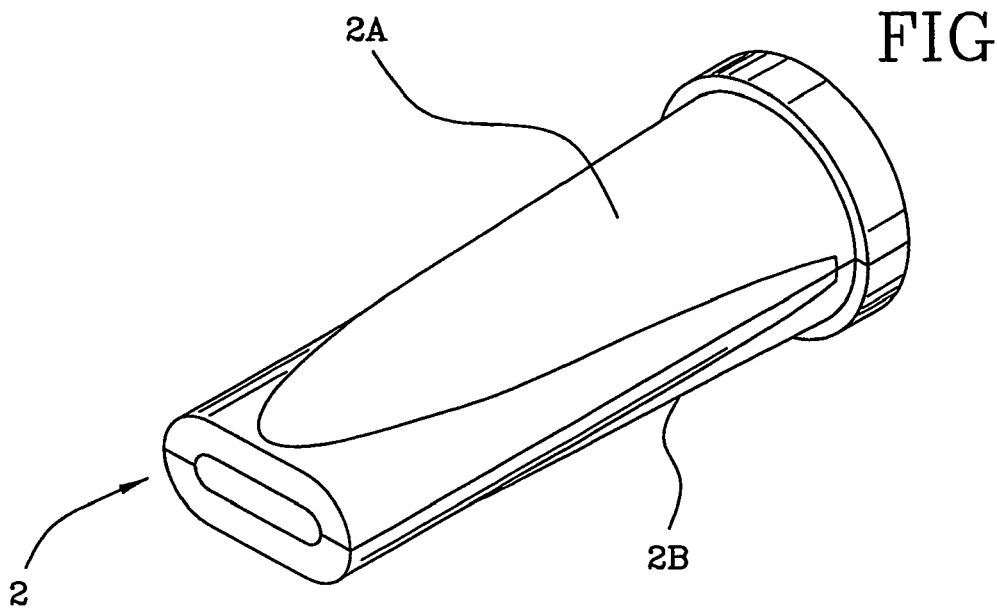
FIG. 8 shows a perspective view of a preferred embodiment of the bush according to the invention.

Moreover, it has been found preferable to give the extrusion channel 15 an initial and final shape with the following characteristics identified in the longitudinal axial plane corresponding to the plane of the drawing of FIGS. 1 and 7:

- the taper of the extrusion channel 15 next to the inlet section of the die 4 is defined by an angle α of between 0° and 45° with respect to the longitudinal axis of said channel;

- the taper of the extrusion channel 15 next to the inlet section of said bush 2 is defined by an angle β of between 5° and 25°;

- the tapered portion of the extrusion channel 15 extends axially from the inlet section of the bush towards the die for at least 30% of the length $l_b$ of the bush.

Preferably, the thickness of the bush along the extrusion channel 15 is between 2 and 8 mm.

In one embodiment the distance of the section shown in FIG. 3 from the beginning of the extrusion channel 15 is between 0% and 50% of the length $l_b$ of the bush 2.

In a further embodiment the distance of the section shown in FIG. 4 from the beginning of the extrusion channel 15 is between 60% and 80% of the length $l_b$ of the bush 2.

The tyre manufacturing method and the extruder according to the present invention achieve several advantages.

Said method comprising the production step of a semi-finished elementary product in elastomeric material by extruding said material, by means of the extruder described above, results in a green tyre free of defects attributable to the machining of the ribbons used. In fact the desired dimensional characteristics of the extruded ribbon and the homogeneity of the elastomeric material of which it is made are produced by an extruder head of extremely restricted longitudinal dimensions. It is therefore possible with the present invention to limit the size of the extruder as mentioned above.

Furthermore, since the bush preferably breaks down into at least two separate parts, the individual parts of said bush are easy to be machined. With the extruder head according to the invention it is therefore possible to avoid phenomena of flow instability, stagnation and dimensional variability of the extrudate, even with sudden changes in the cross section of the extrusion channel due to the abovementioned restricted longitudinal dimensions. In particular, the radially inner surfaces of said parts forming said extrusion channel can be machined to a degree of finish (e.g. by machining processes such as shaping, polishing and surface treatments) such as to increase the speed of the flow of the elastomeric material against the contact surfaces of said bush by limiting the friction phenomena between adjacent layers of elastomeric material during extrusion and between the elastomeric material and the wall of the extrusion channel. The presence of said friction phenomena would cause shear forces to be occured in the elastomeric material leading to an undesirable temperature rise such as to cause scorching of said material and formation of hard granules (clots) which would reduce the processability of the material and the qualitative characteristics of the final ribbon.

Finally, since the bush is preferably assembled from at least two separate parts and each of said parts can be individually machined, a further advantage of the present invention is that the surface hardness desired for the radially inner walls of said bush that form the extrusion channel can be obtained by suitable surface treatment of a base material of low hardness, thus making machining easier, manufacturing time shorter and costs lower.

The invention claimed is:

1. A method for manufacturing a tyre, comprising:
    making at least one semi-finished elementary product of elastomeric material; and
    depositing the at least one elementary product;
    wherein the at least one elementary product is deposited by overlaying the at least one elementary product in adjacent turns on a toroidal support;
    wherein making the at least one elementary product comprises extruding the elastomeric material through an extruder head,
    wherein the extruder head comprises a bushing,
    wherein the bushing defines a tapered extrusion channel,
    wherein the bushing comprises:
        an inlet section; and
        an outlet section;
    wherein a ratio of an area of the inlet section to an area of the outlet section is greater than 5:1 and less than 100:1,
    wherein a ratio of a diameter of the inlet section to a length of the bushing is greater than 0.1:1 and less than 1:1, and
    wherein the bushing comprises at least two parts that can be assembled on a diametrical plane.

2. The method of claim 1, wherein the bushing is delimited by an external surface, and the external surface comprises a profile complementary to an internal profile of a tubular body connected to the bushing.

3. The method of claim 1, wherein the at least one elementary product comprises a ribbon.

4. The method of claim 1, wherein the inlet section comprises a circular cross-section,
    wherein the outlet section comprises a flattened cross-section, and
    wherein a cross-section of the extrusion channel evolves continuously and regularly from the circular cross-section to the flattened cross-section.

5. The method of claim 1, wherein the extrusion channel is formed by axial abutment of cylindrical portions of different diameters, and
    wherein the cylindrical portions are connected together, stepwise, by coaxial annular surfaces perpendicular to an axis of the extrusion channel.

* * * * *